US010493670B2

(12) United States Patent
Borghi et al.

(10) Patent No.: US 10,493,670 B2
(45) Date of Patent: Dec. 3, 2019

(54) APPARATUS FOR FORMING OPENING DEVICES ON A SHEET PACKAGING MATERIAL FOR PACKAGING POURABLE FOOD PRODUCTS

(71) Applicant: TETRA LAVAL HOLDINGS & FINANCE S.A., Pully (CH)

(72) Inventors: Davide Borghi, Modena (IT); Paolo Fontanazzi, Modena (IT); Fabrizio Rimondi, Castel San Pietro Terme (IT); Stefano Flore, Bologna (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 213 days.

(21) Appl. No.: 15/109,192

(22) PCT Filed: Nov. 25, 2014

(86) PCT No.: PCT/EP2014/075453
§ 371 (c)(1),
(2) Date: Jun. 30, 2016

(87) PCT Pub. No.: WO2015/101444
PCT Pub. Date: Jul. 9, 2015

(65) Prior Publication Data
US 2016/0318217 A1    Nov. 3, 2016

(30) Foreign Application Priority Data
Dec. 31, 2013    (EP) .................................... 13199879

(51) Int. Cl.
*B29C 43/06* (2006.01)
*B29C 45/14* (2006.01)
(Continued)

(52) U.S. Cl.
CPC .............. *B29C 43/06* (2013.01); *B29C 43/18* (2013.01); *B29C 43/34* (2013.01); *B29C 45/04* (2013.01);
(Continued)

(58) Field of Classification Search
CPC ... B29C 43/06; B29C 45/04; B29C 45/14344; B29C 43/18; B29C 43/34;
(Continued)

(56) References Cited

U.S. PATENT DOCUMENTS 6,146,563 A   11/2000   Holland et al.
6,303,066 B1  10/2001   Gustafsson et al.
(Continued)

FOREIGN PATENT DOCUMENTS

| EP | 0806273 A2 * | 11/1997 | ......... B29C 45/0433 |
| EP | 2 008 787 A1 | 12/2008 | |
| EP | 2 361 743 A1 | 8/2011 | |

OTHER PUBLICATIONS

Machine Translation of EP 0806273 A2 (Year: 1997).*
(Continued)

Primary Examiner — Leith S Shafi
(74) Attorney, Agent, or Firm — Buchanan Ingersoll & Rooney PC (57) ABSTRACT

There is described an apparatus for forming opening devices on a sheet packaging material for packaging pourable food products; the apparatus comprises conveying means for advancing the packaging material along a given path, at least one molding unit arranged along the path and adapted to mold one opening device on a receiving portion of the packaging material, and at least one movable element carrying the molding unit and advanced parallel to at least a
(Continued)

portion of the path to allow the molding unit to form the opening device while the packaging material is being advanced along the path.

19 Claims, 9 Drawing Sheets

(51) Int. Cl.
| | |
|---|---|
| *B29C 43/18* | (2006.01) |
| *B29C 43/34* | (2006.01) |
| *B29C 45/04* | (2006.01) |
| *B65B 61/18* | (2006.01) |
| *B29L 31/00* | (2006.01) |

(52) U.S. Cl.
CPC ...... *B29C 45/14344* (2013.01); *B65B 61/186* (2013.01); *B29C 2043/3466* (2013.01); *B29C 2043/3483* (2013.01); *B29L 2031/7166* (2013.01)

(58) Field of Classification Search
CPC .... B29C 2043/3483; B29C 2043/3466; B29C 45/14; B29C 45/14549; B29C 45/14565; B29C 45/14581; B29C 45/14336; B29C 2045/14352; B29C 43/36; B29C 31/048; B29C 2043/3444; B29C 2043/3461; B29C 43/183; B29C 43/1184; B29C 43/28; B29C 2043/3433; B65B 61/186; B65B 61/18; B29L 2031/7166; B29L 2031/565; B29K 2623/06; B29K 2105/0067; B29K 2623/12; B31B 50/84
USPC ....... 264/325, 266, 239, 268, 279, 267, 274, 264/275, 273, 328.1; 425/589, 592, 125, 425/129.1, 127, 115, 517; 53/410, 133.4; 493/213
See application file for complete search history.

(56) References Cited

U.S. PATENT DOCUMENTS

| | | | | |
|---|---|---|---|---|
| 6,876,896 | B1 * | 4/2005 | Ortiz | B29C 65/02 318/135 |
| 7,241,129 | B2 * | 7/2007 | Mattice | B29C 33/446 425/350 |
| 2002/0028270 | A1 | 3/2002 | Gustafsson et al. | |
| 2008/0067704 | A1 * | 3/2008 | Ohmori | B29B 11/12 264/2.4 |
| 2009/0302500 | A1 * | 12/2009 | Haynes | B29C 43/00 264/319 |
| 2010/0166923 | A1 | 7/2010 | Martini et al. | |
| 2011/0018166 | A1 * | 1/2011 | Pucci | B29C 31/008 264/266 |
| 2012/0228339 | A1 * | 9/2012 | Kaneko | B65B 9/20 222/566 |
| 2012/0257844 | A1 | 10/2012 | Andersson | |
| 2012/0273996 | A1 | 11/2012 | Martini et al. | |
| 2013/0216638 | A1 * | 8/2013 | Garceau | B29C 43/06 425/145 |
| 2013/0273214 | A1 | 10/2013 | Martini et al. | |
| 2014/0015167 | A1 | 1/2014 | Pucci et al. | |
| 2016/0325471 | A1 | 11/2016 | Martini | |

OTHER PUBLICATIONS

U.S. Appl. No. 15/109,201, filed Jun. 30, 2016 entitled "An Apparatus for Forming Opening Devices on a Sheet Packaging Material for Packaging Pourable Food Products," and published as U.S. Application Publication No. 2016/0325471.
International Search Report (PCT/ISA/210) dated Mar. 17, 2015, by the European Patent Office as the International Searching Authority for International Application No. PCT/EP2014/075453.
Written Opinion (PCT/ISA/237) dated Mar. 17, 2015, by the European Patent Office as the International Searching Authority for International Application No. PCT/EP2014/075453.

* cited by examiner

APPARATUS FOR FORMING OPENING DEVICES ON A SHEET PACKAGING MATERIAL FOR PACKAGING POURABLE FOOD PRODUCTS

TECHNICAL FIELD

The present invention relates to an apparatus for forming opening devices on a sheet packaging material for packaging pourable food products.

BACKGROUND OF INVENTION

As known, many pourable food products, such as fruit juice, UHT (ultra-high-temperature treated) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated strip packaging material.

The packaging material has a multilayer structure substantially comprising a base layer for stiffness and strength, which may comprise a layer of fibrous material, e.g. paper, or mineral-filled polypropylene material, and a number of lamination layers of heat-seal plastic material, e.g. polyethylene films, covering both sides of the base layer.

In the case of aseptic packages for long-storage products, such as UHT milk, the packaging material also comprises a layer of gas-barrier material, e.g. aluminium foil or ethyl vinyl alcohol (EVOH) film, which is superimposed on a layer of heat-seal plastic material, and is in turn covered with another layer of heat-seal plastic material forming the inner face of the package eventually contacting the food product.

Packages of this sort are normally produced on fully automatic packaging machines, on which a continuous tube is formed from the web-fed packaging material; the web of packaging material is sterilized on the packaging machine, e.g. by applying a chemical sterilizing agent, such as a hydrogen peroxide solution, which, once sterilization is completed, is removed from the surfaces of the packaging material, e.g. evaporated by heating; the web of packaging material so sterilized is then maintained in a closed, sterile environment, and is folded and sealed longitudinally to form a vertical tube.

The tube is filled with the sterilized or sterile-processed food product, and is sealed and subsequently cut along equally spaced cross sections to form pillow packs, which are then folded mechanically to form respective finished, e.g. substantially parallelepiped-shaped, packages.

Alternatively, the packaging material may be cut into blanks, which are formed into packages on forming spindles, and the packages are filled with the food product and sealed. One example of this type of package is the so-called "gable-top" package known by the trade name Tetra Rex (registered trademark).

To open the packages described above, various solutions have been proposed, including reclosable opening devices made of plastic material and substantially comprising a pouring element, e.g. a spout, defining a through opening and fitted to a hole in a wall of the package.

When producing one type of opening device, the opening of the pouring element is sealed by a plastic confetti portion connected integrally to the pouring element and detachable from it along a smaller-section annular tearable membrane.

A removable, e.g. screw or hinged, cap can be fitted to the pouring element to outwardly close the latter and to allow closure of the package after the first opening by removing the confetti portion.

On the side destined to face the cap, the confetti portion may have an integral projecting pull ring, the free end of which is pulled by the user to detach the confetti portion from the pouring element along the tearable membrane and so open the product pour opening.

In the case of packages requiring not only liquid but also gas sealing, the opening devices are fitted to removable portions of the packaging material rather than to holes formed in the packaging material. In one such known solution, the confetti portion of the opening device is fixed directly to a pre-laminated hole in the packaging material, i.e. a hole formed in the base layer only and covered by the other lamination layers, including the layer of gas-barrier material.

The above-described opening devices can be produced and applied directly on the edges of the holes formed in the packaging material or on the above-described pre-laminated holes by injection molding operations.

In such method of applying opening devices, the packaging material is advanced along a given path and is stopped when one of its holes or pre-laminated holes is interposed between, and faces, two molds of a molding unit in an open configuration.

At this point, the molds are displaced towards the packaging material to reach a closed configuration, in which they cooperate with opposite faces of the packaging material and define a closed mold cavity housing the hole or the pre-laminated hole on which the opening device is to be formed. The injection molding operation is then performed by injecting the molten plastic material in the mold cavity defined by the molds in the closed configuration.

In the case of an opening device formed on a hole of the packaging material, the molten plastic material is injected into the mold cavity from one side thereof and is forced to flow within the mold cavity to fill it completely. When the molten plastic material sets, the molds are opened and the packaging material can be again advanced to take a new hole between the open molds for forming another opening device.

In the case of an opening device formed on a pre-laminated hole of the packaging material, the molten plastic material is injected onto one side of the pre-laminated hole to cover it up to an annular peripheral portion thereof and to form, in this way, a plastic confetti portion directly attached to the pre-laminated hole; the molten plastic material is then forced to pierce the pre-laminated hole at such annular peripheral portion to form a pouring element of the opening device projecting from an opposite side of the pre-laminated hole and attached to the confetti portion through a smaller-section annular membrane connection portion adapted to be torn by the user to open the package. In this way, the material forming the pre-laminated hole is first pierced through and then resealed by the plastic material forming the pouring element.

Injection molding apparatus of the type described above are used widely and satisfactorily to form opening devices directly on a sheet packaging material. Within the industry, however, a demand for further improvements is felt, particularly in view of the continual request to increase the output rate of the packaging machines and to decrease the footprints thereof.

It is in fact evident that, due to the indexed motion applied to the packaging material to form the opening device on the holes or pre-laminated holes of the packaging material, an increase of the output rate may be only obtained by adopting a large number of molding units with a consequent increase of the footprint of the molding apparatus.

In addition, by using the above-described molding apparatus with multiple molding units, possible errors in the distances between each hole or pre-laminated hole and the adjacent ones necessarily require position corrections by acting on the packaging material between each molding unit and the following one, with further increase of the footprint of the apparatus, reduction of the output rate and increased risks to produce damages or undesired marks on the packaging material.

DISCLOSURE OF INVENTION

It is therefore an object of the present invention to provide an apparatus for forming opening devices on a sheet packaging material for packaging pourable food products, which allows to satisfy the aforementioned demands typically associated with known apparatus and to solve the drawbacks connected therewith.

According to the present invention, there is provided an apparatus as claimed in claim 1.

BRIEF DESCRIPTION OF THE DRAWINGS

Three preferred, non-limiting embodiments of the present invention will be described by way of example with reference to the accompanying drawings, in which.

DETAILED DESCRIPTION OF PREFERRED EMBODIMENTS

Figure 1:
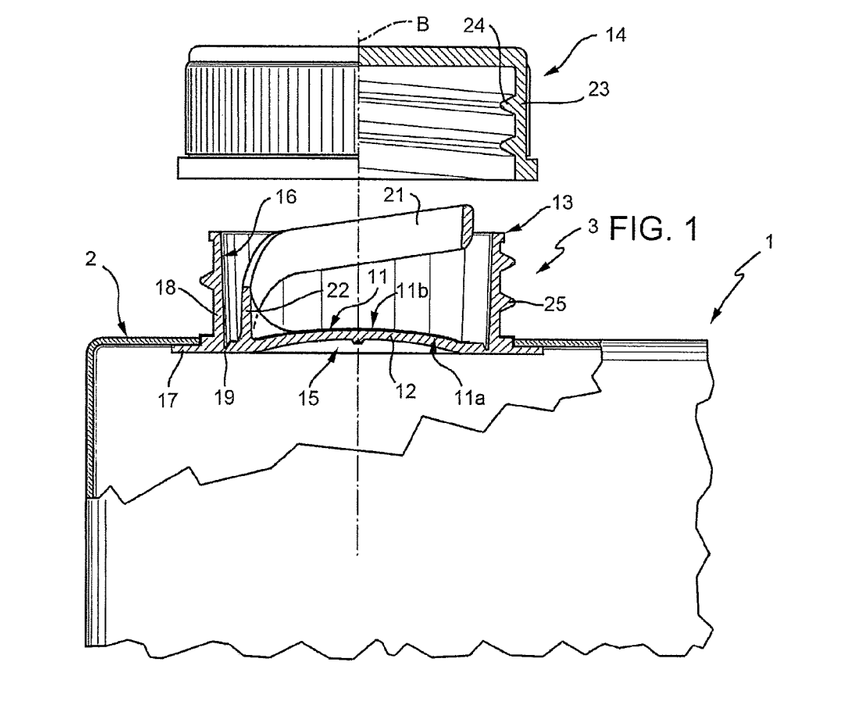
FIG. 1 shows a partly sectioned, exploded side view of a sealed package made of sheet material and on which an opening device is formed using the forming apparatus according to the present invention.

Number 1 in FIG. 1 indicates as a whole a sealed package for pourable food products, made of a multilayer sheet packaging material 2 which is folded and sealed in known manner as described in detail above, and to which an opening device 3 of plastic material is applied using a forming apparatus 10 (shown in FIGS. 3 and 4) according to the present invention.

In the example shown, package 1 is parallelepiped-shaped and of the type known by the trade name Tetra Brik Aseptic (registered trademark). Forming apparatus according to the present invention, however, also applies to advantage to packaging materials for other types of packages, such as the gable-top packages known by the trade name Tetra Rex (registered trademark).

Figure 2:
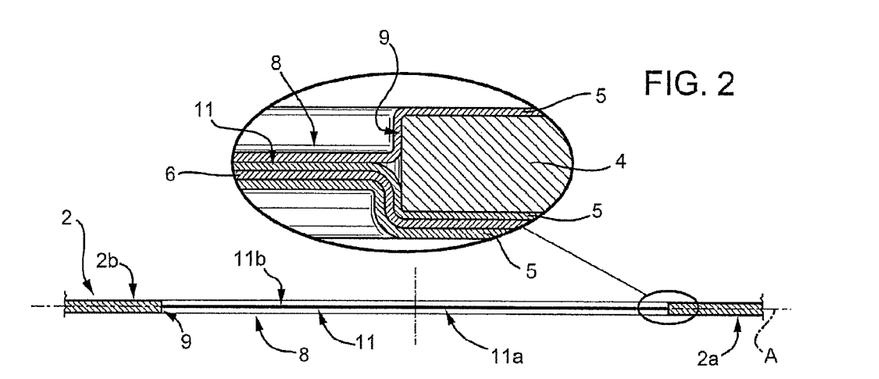
FIG. 2 shows a larger-scale section of the FIG. 1 sheet material before the opening device is applied.

With particular reference to FIG. 2, packaging material 2 comprises a base layer 4 for stiffness and strength, which may be made of fibrous material, e.g. paper, or mineral-filled polypropylene material, and a plurality of layers 5 of heat-seal plastic material, e.g. polyethylene films, covering both sides of base layer 4.

In the case of an aseptic package 1 for long-storage products, such as UHT milk, packaging material 2 also comprises a layer 6 of gas-barrier material, e.g. aluminium foil or ethyl vinyl alcohol (EVOH) film, which is superimposed on a layer 5 of heat-seal plastic material, and is in turn covered with another layer 5 of heat-seal plastic material forming the inner face of package 1 eventually contacting the food product.

In other words, layers 5 and 6 define respective lamination layers applied to base layer 4 when producing packaging material 2 in the form of a continuous strip.

Packaging material 2 also comprises a number of receiving portions 8 (see FIGS. 2 to 6) equally spaced in a lengthwise direction A of the packaging material, and to which opening devices 3 are subsequently molded by using forming apparatus 10.

In the example shown, each receiving portion 8 is defined by a so-called pre-laminated hole, i.e. a hole 9 formed through base layer 4 of packaging material 2 and covered by lamination layers 5, 6, so that the hole 9 is sealed by a relative sheet cover portion 11.

In a possible alternative embodiment not shown, cover portion 11 may even be defined by only one or some of layers 5, 6. For example, cover portion 11 may be made solely of gas-barrier material.

In another possible alternative embodiment not shown, cover portion 11 may be defined by a patch fixed to the rest of packaging material 2 to seal a hole formed, in this case, through the full thickness of the packaging material.

In a further alternative embodiment not shown, each receiving portion 8 may be simply defined by a hole formed through the full thickness of the packaging material 2 and which is destined to be sealed by the relative opening device 3.

As shown in particular in FIG. 1, opening device 3 has an axis B, which is substantially perpendicular to the relative cover portion 11. Opening device 3 substantially comprises a confetti portion 12 adhering to one side 11*a* of the relative cover portion 11—in the example shown, the side eventually facing inwards of the relative package 1—, and a cylindrical tubular pouring element 13, which is fixed to packaging material 2 about the relative hole 9, defines an opening 16 by which to pour the food product from the relative package 1, and extends through the cover portion 11 as a follow-on from the piercing thereof so as to be arranged on both sides 11*a*, 11*b* of the cover portion 11.

A cap 14 (FIG. 1) is fitted removably to each pouring element 13 to outwardly close the relative opening 16 even after removal of the confetti portion 12 and the cover portion 11.

More specifically, confetti portion 12 and pouring element 13 are molded in one piece and define one opening device 3, whilst the relative cap 14 is formed separately from the opening device 3 and then applied thereto.

Confetti portion 12 and cover portion 11 together define a sealing portion 15 sealing opening 16 of the relative pouring element 13.

As shown particularly in FIG. 1, pouring element comprises an annular flange portion 17, fixed to packaging material 2 about the relative hole 9, and a cylindrical tubular neck portion 18 projecting axially from an inner lateral edge of flange portion 17, and extending through a peripheral annular portion of the relative cover portion 11. In other words, neck portion projects from packaging material 2 on side 11b opposite the side 11a to which the relative confetti portion 12 is fixed.

As shown in FIG. 1, confetti portion 12 and flange portion 17 are joined by an annular membrane connection portion 19, which is smaller in section than the portions 12 and 17, so as to tear easily to detach the sealing portion 15 from pouring element 13. In other words, annular membrane connection portion 19 defines a tear line along which to detach confetti portion 12 from pouring element 13.

On the side destined in use to face the relative cap 14, confetti portion 12 may have an integral projecting pull ring 21, which is used by the user to detach the sealing portion 15 from pouring element 13 along annular membrane connection portion 19 and so free opening 16 to pour out the product.

More specifically, pull ring 21 extends inside, and at a predetermined distance from, neck portion 18, and is joined to confetti portion 12 by a tab 22.

As shown in FIG. 1, cap 14 is of a screw type and has a cylindrical lateral wall 23 with an inner thread 24, which engages a corresponding outer thread 25 on neck portion 18 of pouring element 13.

Figure 3:
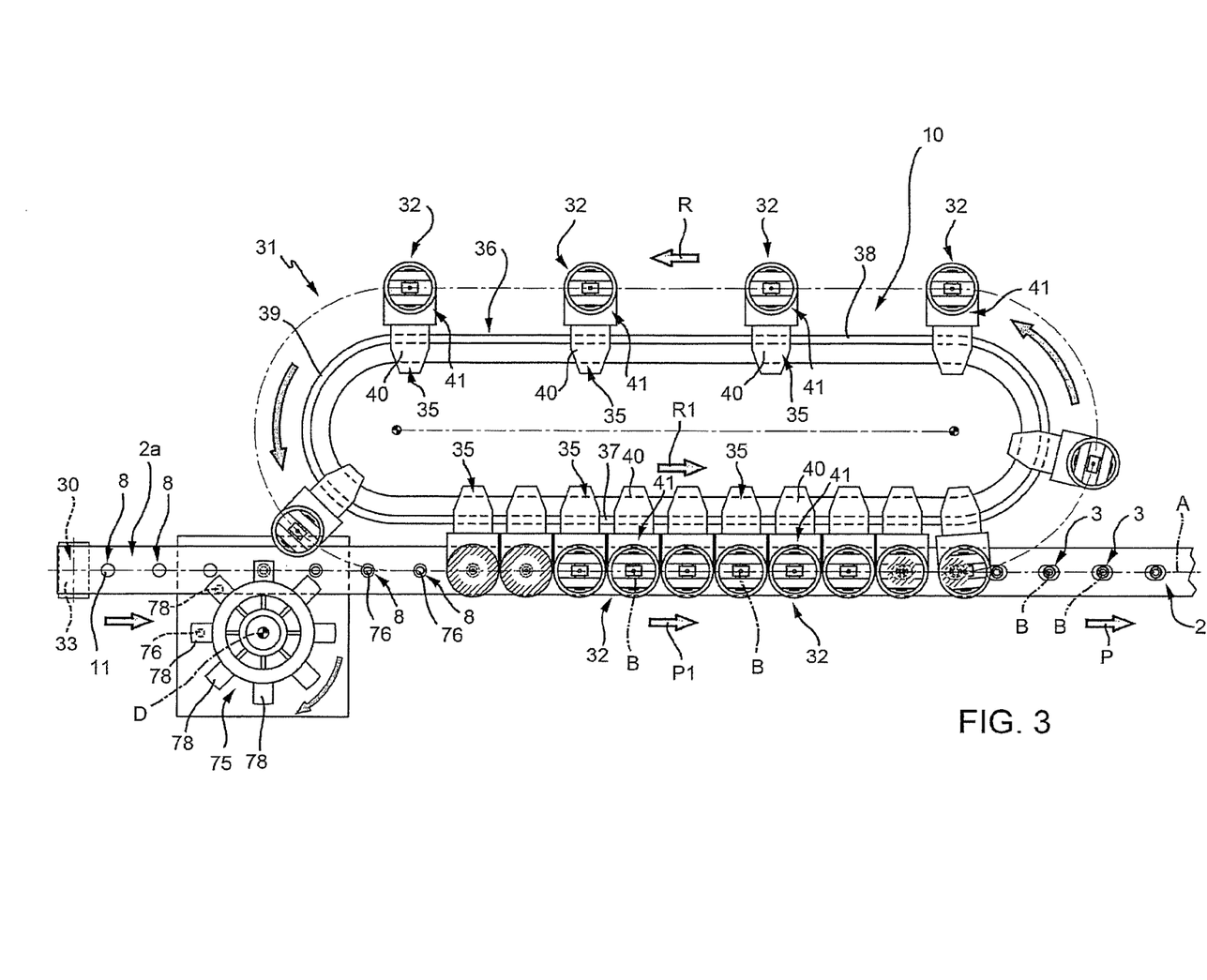
FIG. 3 shows a top view, with parts removed for clarity, of the forming apparatus according to the present invention.
Figure 4:
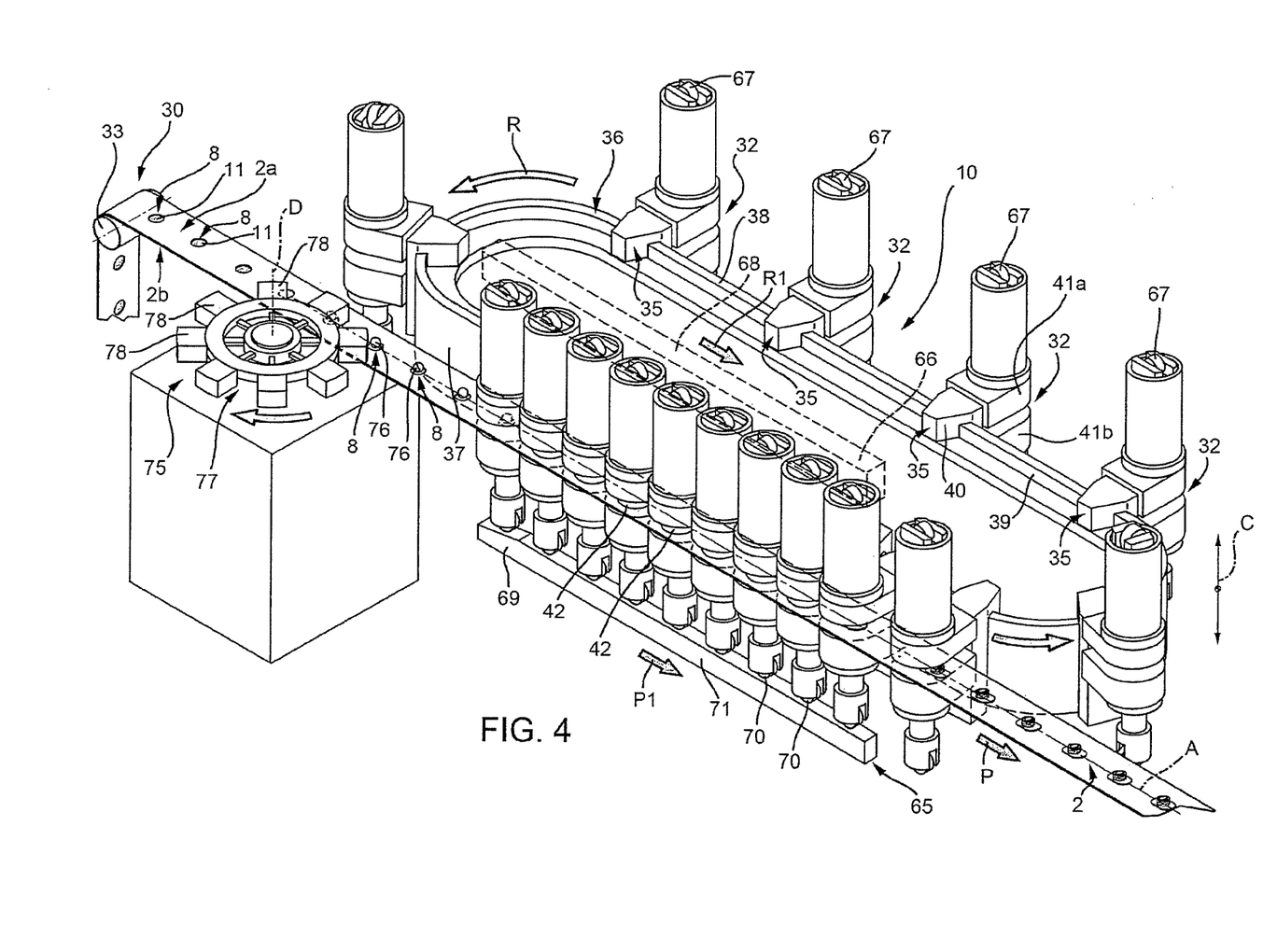
FIG. 4 shows a perspective view, with parts removed for clarity, of the FIG. 3 forming apparatus.

With reference to FIGS. 3 and 4, forming apparatus 10 comprises conveying means 30 for advancing packaging material 2 along a given path P, which in the example shown coincides with direction A, and a molding station 31 arranged along path P and in turn having one or more molding units 32 adapted to cooperate with packaging material 2 to mold one opening device 3 on each receiving portion 8.

In particular, conveying means 30 comprise one or more powered rollers 33 (only one shown in FIGS. 3 and 4), about which packaging material 2 is looped to be advanced along path P.

As shown in FIGS. 3 and 4, molding station 31 is arranged in a position adjacent to one side of packaging material 2 and comprises a plurality of molding units 32 adapted to protrude towards packaging material 2 along a molding portion P1 of path P, wherein the molding units perform respective molding operations on receiving portions 8 of packaging material 2. In practice, along molding portion P1 of path P, each molding unit 32 is so configured to face, and cooperate with, opposite faces 2a, 2b of packaging material 2.

In the example shown, face 2a of packaging material 2 is the one eventually facing inwards of the relative package 1 and defines the upper side of packaging material 2 in FIGS. 3 to 8; as a consequence, face 2b defines the bottom side of packaging material 2.

Molding station 31 advantageously comprises a plurality of movable elements 35 carrying respective molding units 32 and advanced parallel to molding portion P1 of path P; each movable element 35 is advanced at the same speed as packaging material 2 at least during interaction of the corresponding molding unit 32 with the packaging material 2 itself to allow such molding unit 32 to form a relative opening device 3 while the packaging material 2 is being advanced along path P.

Movable elements 35 are advantageously moved independently from one another along a closed loop track 36 arranged on one side of packaging material 2 and molding portion P1 of path P.

In practice, forming apparatus 10 comprises sensor means adapted to detect the positions of receiving portions 8 and to generate respective signals to control movable elements 35 as a function of the detected positions.

As shown in FIGS. 3 and 4, track 36 defines a closed loop path R for movable elements 35. In particular, track 36 extends horizontally and on one side of packaging material 2, which also lies horizontally along molding portion P1 of path P.

More specifically, in the example shown, track 36 houses a stator armature formed by a plurality of individually-excitable solenoids (known per se and not shown), and movable elements 35 are defined by respective carts housing respective permanent magnets (known per se and not shown) and independently moved along track 36 by individually controlling the solenoids.

According to a possible alternative not shown, track 36 may be also provided with the permanent magnets and movable elements 35 may house the individually-excitable solenoids.

As visible in FIGS. 3 and 4, track 36 has a work portion 37 arranged on one side of the packaging material 2; work portion 37 of track 36 defines a work portion R1 of path R in turn extending parallel and adjacent to molding portion P1 of path P; track 36 also has a return portion 38 to allow movable elements 35 to move cyclically along path R.

In the example shown in FIGS. 3 and 4, track 36 has an endless rib 39 configured to receive movable elements 35 in a sliding manner and defining closed loop path R; more specifically, each movable element 35 has an engaging portion 40 complementary in shape to rib 39 and coupled therewith in a sliding manner.

In the following description, reference is made to one movable element 35 and one molding unit 32 for the sake of simplicity.

With reference to FIGS. 3, 4, 6, 7 and 8, movable element 35 comprises engaging portion 40, cooperating in sliding manner with endless rib 39, and a support body 41 carrying molding unit 32. In particular, support body 41 protrudes outwards from track 36 and has two portion 41a, 41b, both connected to engaging portion 40 and spaced from one another parallel to a direction C orthogonal to packaging material 2 along molding portion P1 of path P, i.e. vertically spaced in the example shown, to allow feed of the packaging material 2 therebetween and/or arrangement of such portions 41a, 41b in positions facing opposite faces 2a, 2b of the packaging material 2.

With particular reference to FIGS. 4, 6, 7 and 8, molding unit 32 comprises a first and a second mold 42, 43, which are respectively carried by portions 41a, 41b of support body 41; in use, during the molding operation, first and second mold 42, 43 are coaxial with axis B of the opening device 3 being formed and are arranged facing respective faces 2a, 2b of packaging material 2.

It is pointed out that axis B of the opening device 3 to be formed on a receiving portion 8 of packaging material 2 is parallel to direction C.

First and second mold 42, 43 are normally set in an open configuration (FIGS. 6 and 8), in which they are spaced from one another parallel to direction C to allow feed of packaging material 2 therebetween and/or arrangement of the first and second mold 42, 43 in positions facing opposite faces 2a, 2b of the packaging material 2.

In order to perform molding, first and second mold 42, 43 are set in a closed configuration, in which they cooperate with opposite faces 2a, 2b of packaging material 2 and delimit a closed mold cavity 44 housing one receiving portion 8 of packaging material 2 and adapted to be filled with molten plastic material to define, when the plastic material sets, the opening device 3, i.e. the one-piece body comprising confetti portion 12 and pouring element 13.

In greater details, when advanced along portion P1 of path P, first mold 42 faces face 2a of packaging material 2, whilst second mold 43 faces face 2b of the same.

This means that, in the solution disclosed in FIGS. 3, 4, 6, 7 and 8 and along molding portion P1 of path P, first mold 42 is placed above packaging material and second mold 43 is arranged below the packaging material 2.

In this specific solution, first mold 42 is made in one piece and is carried by portion 41a of support body 41 of movable element 35 in a sliding manner parallel to direction C; first mold 42 may also comprise two or more components coupled to one another and moved as a whole parallel to direction C.

First mold 42 has a head portion 46 facing, along molding portion P1 of path P, packaging material 2 and defining a forming surface 47 delimiting one side of mold cavity 44 in the closed configuration of first and second mold 42, 43.

In the specific solution disclosed in FIGS. 3, 4, 6, 7 and 8, second mold 43 comprises an outer annular element 50, a core element 51 engaging a through opening of outer annular element 50, and an intermediate annular element 53 also engaging opening 52 and radially interposed between outer annular element 50 and core element 51. Core element 51 and intermediate annular element 52 cooperate with one another in a sliding manner parallel to direction C. Outer annular element 50 is made up of a plurality of components 54 which can be radially opened to allow disengagement of the opening device 3 from second mold 43.

Figure 7:
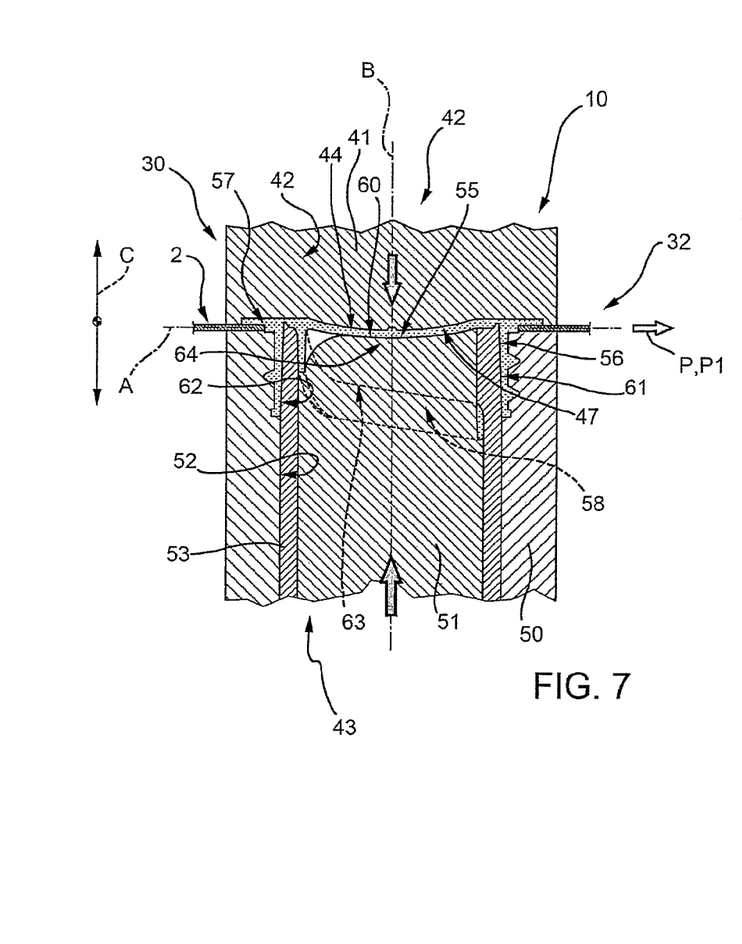

With particular reference to FIG. 7, mold cavity 44 defines, when in operation:
- a confetti-shaped chamber 55 of axis B, which houses cover portion 11 of a relative receiving portion and is adapted to define in use confetti-shaped portion 12 and annular flange portion 17 of opening device 3;
- a tubular chamber 56 extending, coaxially with axis B, from one side of a flat annular peripheral portion 57 of chamber 55, and which is adapted to define in use neck portion 18 of opening device 3; and
- a shaped chamber 58 which defines pull ring 21 of confetti portion 12, and extends from the same side as chamber 56, and from a radially inner point of chamber 55 with respect to annular peripheral portion 57.

In particular, chamber 55 is delimited, on one side, by forming surface 47 of first mold 42 and, on the opposite side, by a forming surface 60 defined by a head portion 64 of second mold 43 facing packaging material 2 along portion P1 of path P; in greater details, forming surface 60 is defined by head portions of the various component elements of second mold 43, i.e. outer annular element 50, core element 51 and intermediate annular element 53.

Chamber 56 is delimited, on one side, by radially outer surface 61 of intermediate annular element 53 and, on the opposite side, by radially inner surface 62 of outer annular element 50.

Chamber 58 is instead entirely defined by an inner shaped surface 63 of core element 51.

With particular reference to FIG. 4, forming apparatus 10 further comprises actuator means 65 to move first and second mold 42, 43 of each molding unit 32 from the open configuration to the closed configuration while the relative movable element 35 is advanced parallel to molding portion P1 of path P and at the same speed as packaging material 2.

In the specific solution disclosed in FIGS. 3 and 4, actuator means 65 comprise a cam element 66 (only partially disclosed in FIG. 4) arranged in a fixed position facing face 2a of the portion of packaging material 2 advancing along molding portion P1 of path P, and a cam follower 67 carried by each first mold 42 and sliding along cam element 66; cam element 66 has a work portion 68 lowered with respect to the rest of cam element 66 towards the portion of packaging material 2 advanced along molding portion P1 of path P so as to produce a displacement of first molds 42 to the closed configuration by means of interaction of the respective cam followers 67 with such work portion 68. In other words, work portion 68 is arranged at a smaller distance from packaging material 2 than the rest of the cam element 66 so as to produce a translation of each first mold 42 parallel to direction C towards packaging material 2, while such first mold 42 is advanced along portion P1 of path P by the movement of the relative movable element 35 along work portion R1 of path R.

In a completely analogous manner, actuator means 65 further comprise a further cam element 69 (only partially disclosed in FIG. 4) arranged in a fixed position facing face 2b of the portion of packaging material 2 advancing along molding portion P1 of path P, and a cam follower 70 carried by each second mold 43 and sliding along cam element 69; cam element 69 has a work portion 71 raised with respect to the rest of cam element 69 towards the portion of packaging material 2 advanced along molding portion P1 of path P so as to produce a displacement of second molds 43 to the closed configuration by means of interaction of the respective cam followers 70 with such work portion 71. In other words, work portion 71 is arranged at a smaller distance from packaging material 2 than the rest of the cam element 69 so as to produce a translation of each second mold 43 parallel to direction C towards packaging material 2, while such second mold 43 is advanced along molding portion P1 of path P by the movement of the relative movable element 35 along work portion R1 of path R.

According to a possible alternative not shown, actuator means 65 may comprise only one cam element cooperating with only one mold of molding unit 32, the other mold of the same molding unit 32 being maintained in a fixed position along molding portion P1 of path P, in this case, the closed configuration of the molds of each molding unit 32 may be obtained my moving only one of the molds parallel to direction C.

According to other possible alternatives not shown, actuator means 65 may include one or more fluidic actuators or motors acting on one or both molds of each molding unit 32 to set such molds in the closed configuration.

Figure 5:
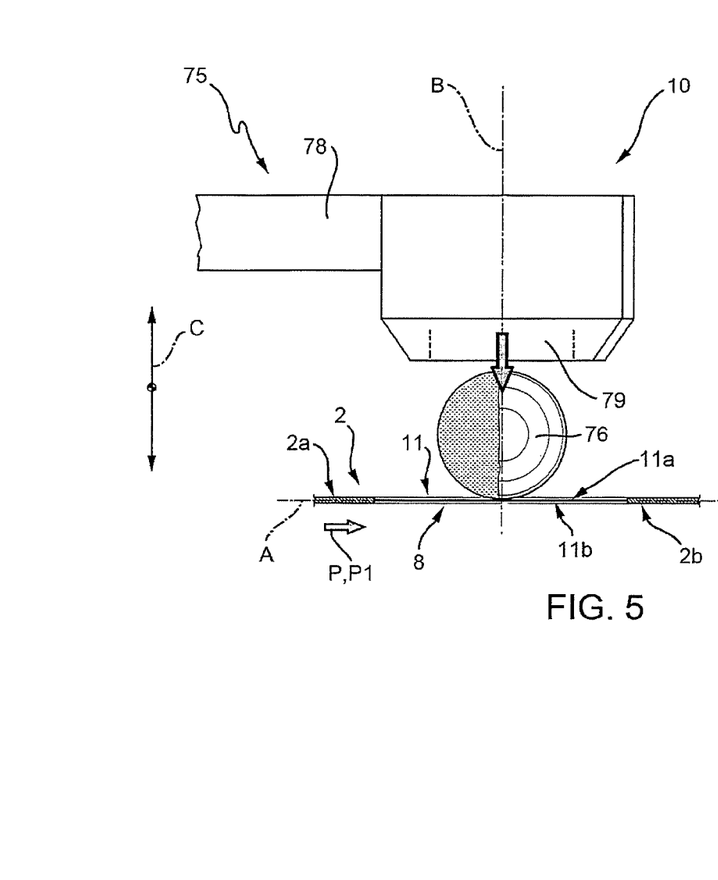
FIG. 5 shows a larger-scale side view of a portion of a feeding device of the forming apparatus of FIGS. 3 and 4 during an operation of feeding a dose of molten plastic material onto a packaging material for forming the FIG. 1 package.
Figure 6:
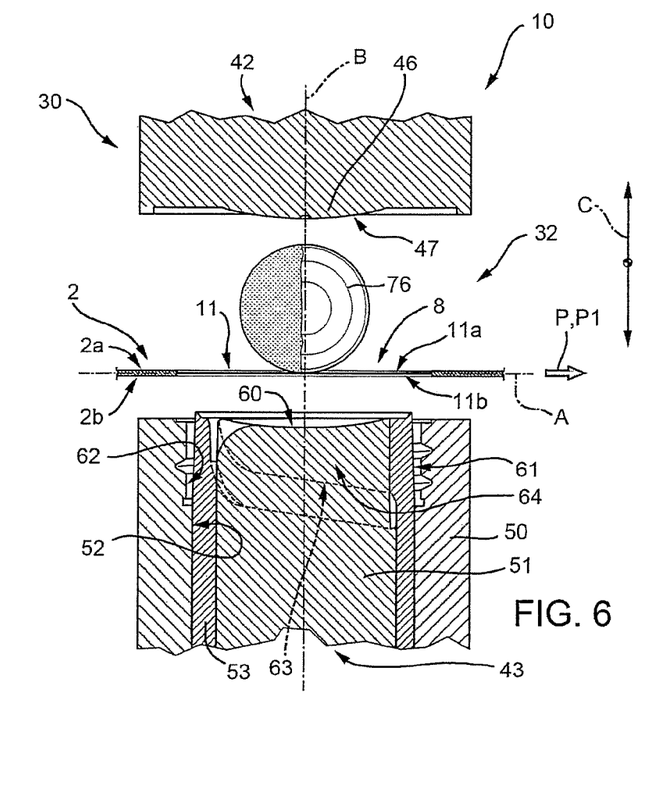
FIGS. 6 to 8 show larger-scale partial sections of a molding unit of the forming apparatus of FIGS. 3 and 4, during different operating conditions and with parts removed for clarity.

With reference to FIGS. 3, 4 and 5, forming apparatus 10 further comprises a feeding device 75 to feed one dose 76 of molten plastic material onto each receiving portion 8 of packaging material 2 prior to interaction of such receiving portion 8 with first and second mold 42, 43 of the relative molding unit 32.

In particular, feeding device 75 receives the doses 36 from a molten plastic material distributing unit, for example an extruder not shown, and delivers each dose 36 onto a relative receiving portion 8 of packaging material 2.

It is pointed out that the term "dose" is used in the present description and in the claims to indicate a pre-defined/measured amount of plastic material in a paste state, i.e. in a molten or semi-molten state, which is removed from the molten plastic material delivering unit.

In the example shown in FIGS. 3, 4, 5, feeding device 75 is arranged upstream of molding station 31 along path P and is configured to receive a succession of doses 76 of molten plastic material from the molten plastic material delivering unit and to feed such doses on side 11a of cover portions 11 of respective receiving portions 8.

In particular, feeding device 75 comprises a carousel 77, which is mounted to rotate about a vertical axis D parallel to direction C and includes a plurality of radial branches 78, each one provided with a delivery portion 79 to feed one dose 76 onto a relative receiving portion 8 of packaging material 2.

Forming surfaces 47 and 60 of each molding unit 31 define pressing means to exert pressure on a relative dose 76, placed on a corresponding receiving portion 8 of the packaging material 2, to force the molten plastic material of such dose 76 to fill the relative mold cavity 44 and to form one opening device 3.

In use, forming one opening device 3 on a relative receiving portion 8 of packaging material 2 is performed as follows.

First, feeding device 75 releases one dose 76 of molten plastic material to one receiving portion 8 of packaging material 2 prior to the receiving portion 8 reaching molding station 31.

At this point, one movable element 35, carrying a relative molding unit 32, is advanced along work portion R1 of path R to position such molding unit 32 aligned with the receiving portion 8 with the dose 36 in a direction parallel to direction C.

In this stage, first and second mold 42, 43 of molding unit 32 are in the open configuration.

Starting from this point, movable element 35 and molding unit 32 are advanced so as to reach the receiving portion 8 on which one opening device 3 is to be formed.

By interaction of cam followers 67, 70 with work portions 68, 71 of respective cam elements 66, 69, first and second mold 42, 43 are displaced to the closed configuration (FIG. 7), in which they define closed mold cavity 44 in turn completely receiving the receiving portion 8.

During the movement from the open to the closed configuration, first and second mold 42, 43 exert a compressing action on the dose 76, which is forced to fill the entire mold cavity 44 and to form opening device 3.

In particular, dose 76 is compressed by forming surface 47 against side 11a of cover portion 11; in practice, the molten plastic material of dose 76 gradually flows along side 11a of cover portion 11 while closed mold cavity 44 is formed by first and second mold 42, 43 contacting packaging material 2 on both opposite faces 2a, 2b. The molten plastic material fills the entire confetti-shaped chamber 55 from a central portion thereof towards annular peripheral portion 57.

The pressing action on the molten plastic material contained in confetti-shaped chamber 55 pushes cover portion 11 of packaging material 2 against second mold 43, so that side 11b of cover portion 11 contacts forming surface 60.

At this stage, layer 5 of heat-seal plastic material of cover portion 11, facing first mold 42, melts with the plastic material into mold cavity 44.

The molten plastic material spreads radially inside confetti-shaped chamber 55 until it eventually reaches the intersection of this chamber 55 with shaped chamber 58, where cover portion 11, having no solid support by second mold 43, is pierced neatly by the pressure of the molten plastic material; at this point, molten plastic material fills the whole of shaped chamber 58.

In exactly the same way, when the molten plastic material reaches the annular portion at the intersection of confetti-shaped chamber 55 and tubular chamber 56, cover portion 11 is pierced by the pressure of the molten plastic material, which therefore flows into the whole of tubular chamber 56 to form neck portion 18 of pouring element 13 and thread 25.

In other words, the molten plastic material of dose 36 pierces through cover portion 11 at the intersections between confetti-shaped chamber 55 and tubular and shaped chambers 56 and 58 of mold cavity 44 to form through openings, which are subsequently sealed off by the plastic material to fully restore the integrity of packaging material 2.

Once the plastic material filling the whole of mold cavity 44 sets, components 54 of outer annular element 50 of second mold 43 radially open and first and second mold 42, 43 are moved to the open configuration so as to allow extraction of opening device 3 from molding unit 32.

The opening of first and second mold 42, 43 occurs when cam followers 67, 70 leave work portions 68, 71 of respective cam elements 66, 69.

At this point, movable element 35 and molding unit 32 are sped up along return portion 38 of track 36 to reach another receiving portion 8 fed with one dose 76 of molten plastic material to form one opening device 3.

Number 10' in FIGS. 9 to 12 indicates as a whole a different embodiment of an apparatus in accordance with the present invention for forming opening devices 3 on packaging material 2; apparatus 10 and 10' being similar to one another, the following description is limited to the differences between them, and using the same references, where possible, for identical or corresponding parts.

Apparatus 10' differs from apparatus 10 in that feeding device 75 is configured and arranged along path P to selectively feed one dose 76 of molten plastic material directly to each molding unit 32 in the open configuration thereof.

In particular, each molding unit 32 comprises a first mold 42', which has the same forming surface 47 as the ones of first molds 42 of forming apparatus 10, but has a different structure with respect to the ones of the first molds 42, as it defines a seat 83 open towards packaging material 2 to receive one dose 76 of molten plastic material from feeding device 75. Each molding unit 32 further comprises a second mold 43' which can be identical to second molds 43 of forming apparatus 10.

In greater details, first mold 42' comprises an outer annular element 80 and a core element 81, coupled to one another in a sliding manner parallel to direction C; in particular, core element 81 engages a through opening 82 of annular element 80.

First mold 42' can be set in a first configuration (FIGS. 9 and 10), in which annular element 80 axially protrudes from core element 81 towards packaging material 2 and delimits, together with core element 81, seat 83 for receiving dose 76 from feeding device 75, and a second configuration (FIGS. 11 and 12), in which core element 81 engages the full axial height of opening 82 of annular element 80 and defines, through its head portion facing packaging material 2 and together with adjacent head portion of annular element 80, forming surface 47 delimiting one side of mold cavity 44 in the closed configuration of first and second mold 42', 43'.

In practice, seat 83 of first mold 42' defines part of mold cavity 44 in the closed configuration of first and second mold 42', 43'.

It should be noted that, in this specific solution, packaging material 2 is advanced along molding portion P1 of path P in a reversed condition with respect to the solution shown in FIGS. 3 to 8; in particular, in this case, face 2a defines the lower side of packaging material 2, whilst face 2b defines the upper side thereof; as a consequence, along molding portion P1 of path P, first mold 42' of each molding unit 32 is positioned below packaging material 2 and second mold 43' is instead positioned above the packaging material 2.

Figure 8:
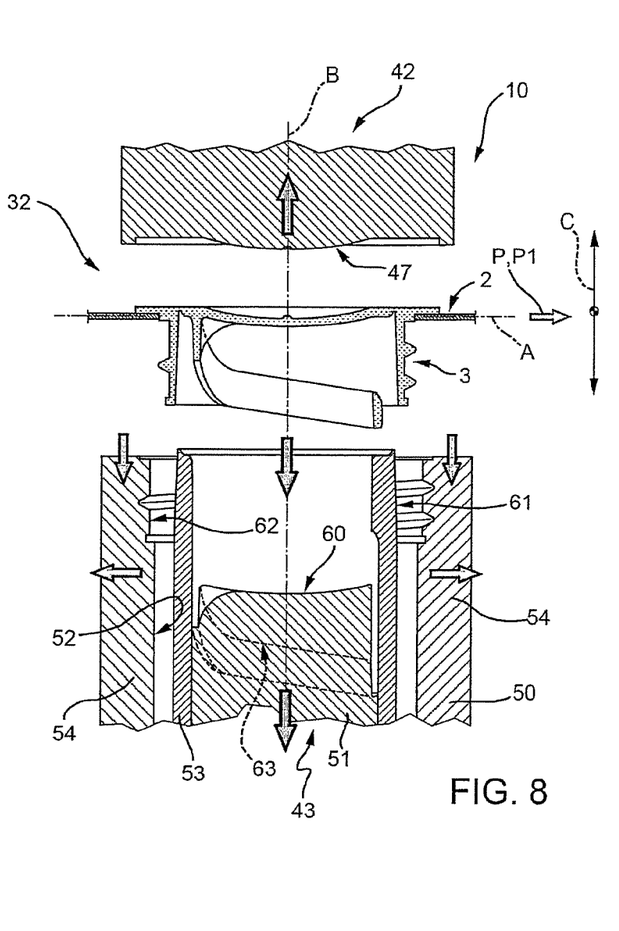
Figure 9:
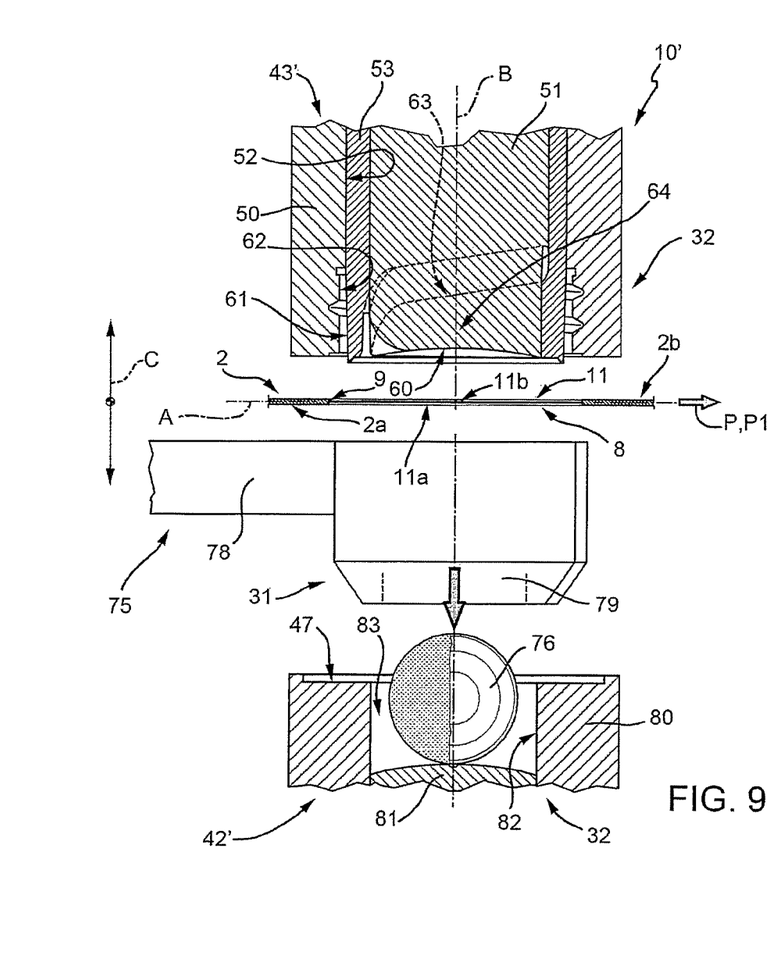
FIGS. 9 to 12 show partial sections of a different embodiment of a molding unit of a forming apparatus according to the present invention, during different operating conditions and with parts removed for clarity.
Figure 10:
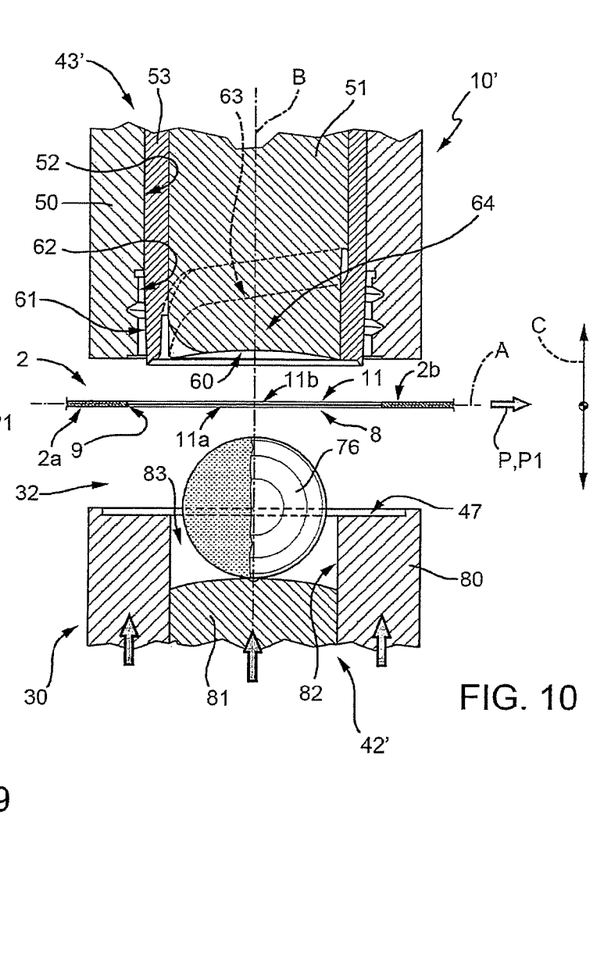
Figure 11:
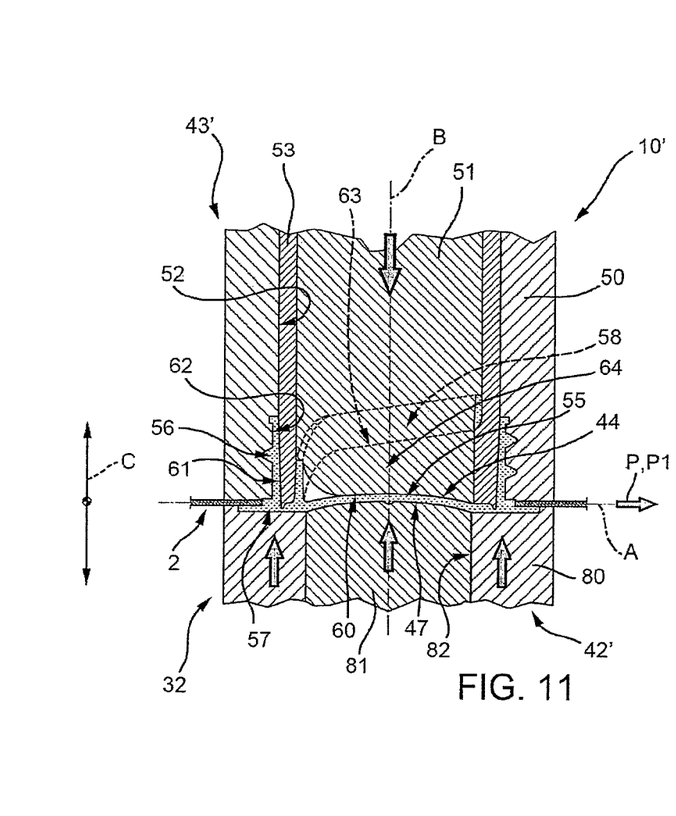
Figure 12:
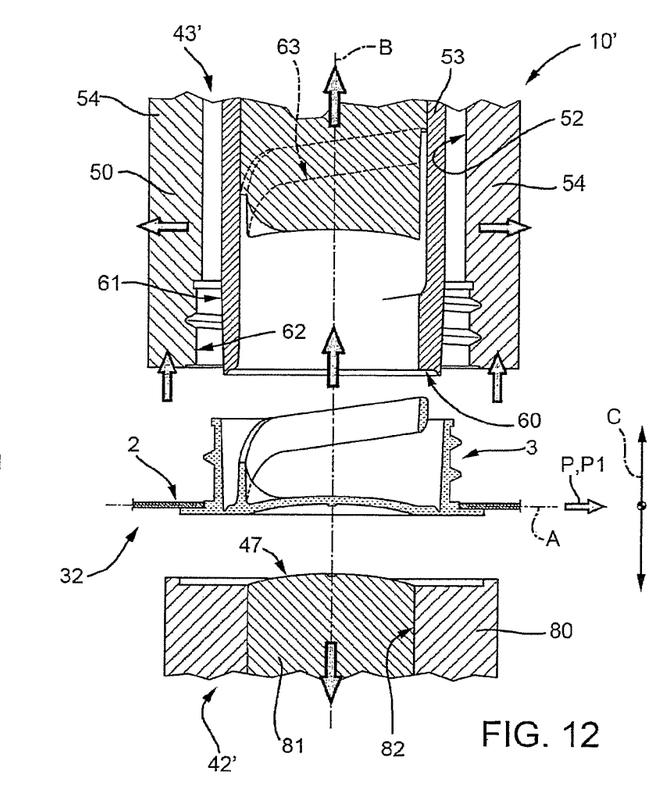

As shown in FIG. 8, feeding device 75 is adapted to interpose in use one of its arms 77 between first mold 42' of each molding unit 32 and packaging material 2 to feed one dose 76 to seat 83 of the first mold 42'.

The operation of forming apparatus 10' is equivalent to the one relative to forming apparatus 10, except that doses 76 are fed to each molding unit 32 into seat 83 of the relative first mold 42'.

During displacement of first and second mold 42', 43' of each molding unit 32 to the closed configuration, a relative movement occurs between core element 81 and outer annular element 80 to reach the second configuration of the first mold 42'; in the meantime, the dose 76 placed in seat 83 of the first mold 42' is compressed by forming surface 47 against side 11a of cover portion 11.

Number 10" in FIGS. 13 to 16 indicates as a whole a different embodiment of an apparatus in accordance with the present invention for forming opening devices 3 on packaging material 2; forming apparatus 10" being similar to forming apparatus 10, the following description is limited to the differences between them, and using the same references, where possible, for identical or corresponding parts.

Apparatus 10" differs from apparatus 10 in that feeding device 75 is configured and arranged along path P to selectively feed one dose 76 of molten plastic material directly to each molding unit 32 in the open configuration thereof.

In particular, each molding unit 32 comprises a first mold 42", which has the same forming surface 47 as the ones of first molds 42 of forming apparatus 10, but has a different structure with respect to the ones of the first molds 42; more specifically, in this case, first mold 42" of each molding unit 32 has, on its side opposite the side facing packaging material 2, an open seat 84 to receive one dose 76 of molten plastic material from feeding device 75. Each molding unit 32 further comprises a second mold 43" which can be identical to second molds 43 of forming apparatus 10.

Analogously to first and second molds 42, 43 of apparatus 10, first and second mold 42", 43" of each molding unit 32 are selectively set in an open configuration (FIGS. 13, 14 and 16), in which they are spaced from one another parallel to direction C, and in a closed configuration (FIG. 15), in which they cooperate with respective opposite faces 2a, 2b of packaging material 2 and define closed mold cavity 44.

Figure 13:
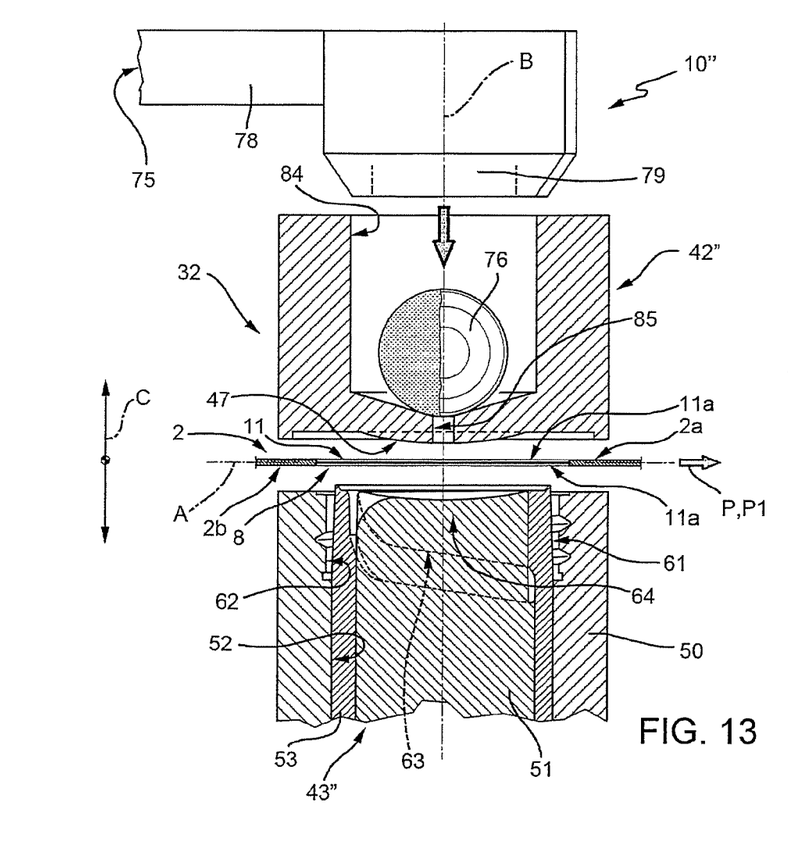
FIGS. 13 to 16 show partial sections of a further embodiment of a molding unit of a forming apparatus according to the present invention, during different operating conditions and with parts removed for clarity.
Figure 14:
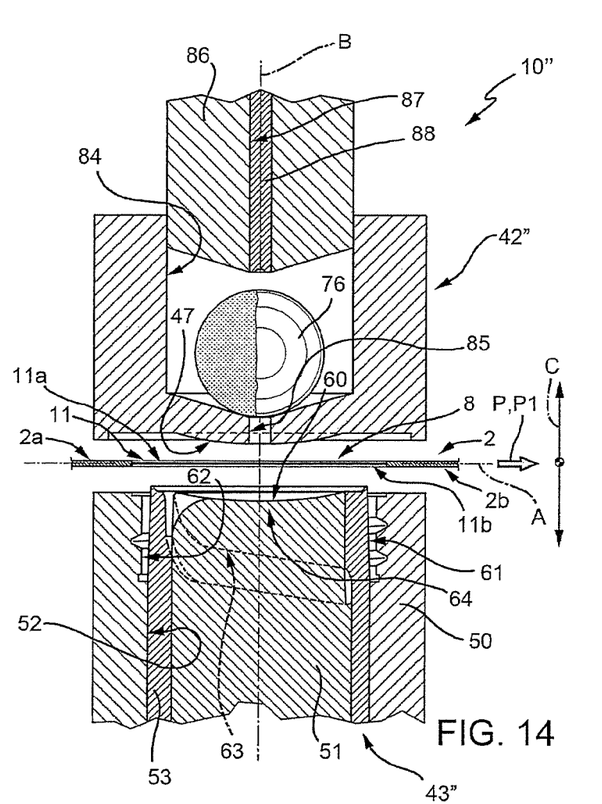
Figure 15:
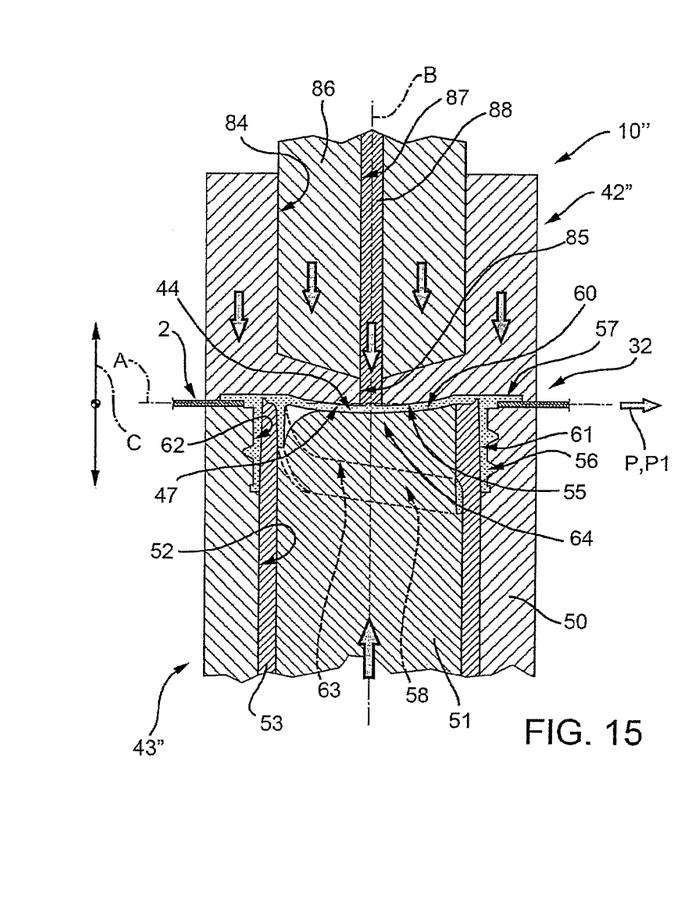
Figure 16:
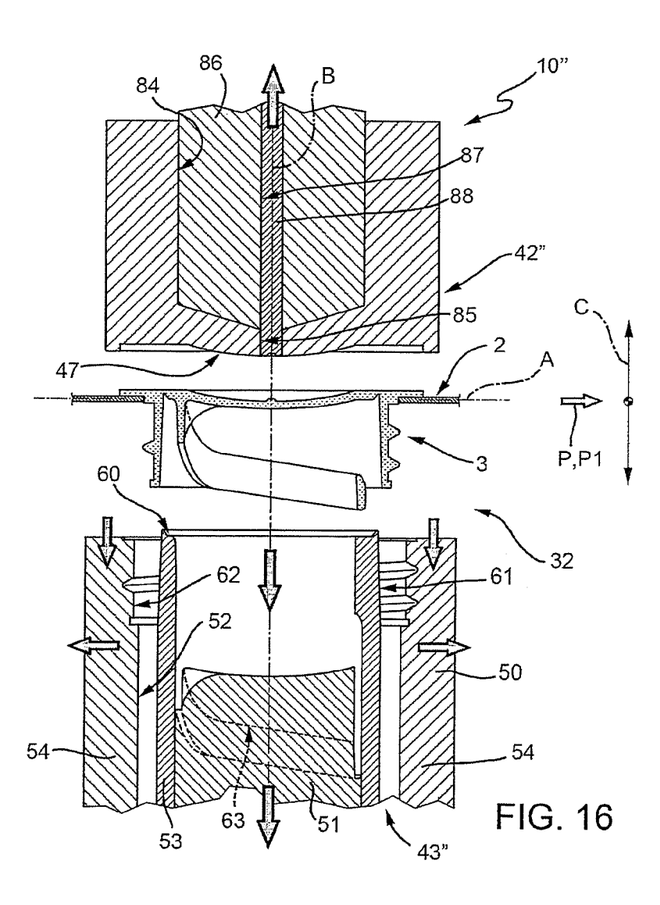

As previously indicated, dose 36 of molten plastic material is fed by feeding device 75 into seat 84 of first mold 42", when first and second mold 42", 43" are in the open configuration (FIG. 13).

Seat 84 is connected in use to mold cavity 44 through an axial channel 85 extending from a bottom wall of the seat 84 to forming surface 47.

First mold 42" further comprises a plunger 86 slidably engaging seat 84 to press in use dose 76 placed in said seat 84 to force the molten plastic material to flow into mold cavity 44.

In particular, plunger 86 is displaceable parallel to direction C between an extracted position, in which it is detached from the open side of seat 84 in order to allow feeding of a dose 76 into the seat 84, and a final pressing position, in which it fully engages seat 84 and forces the molten plastic material forming dose 76 to flow through channel 85 into mold cavity 44.

Displacement of plunger 86 from the extracted position to the final pressing position is activated as first and second mold 42", 43" are in their closed configuration.

Plunger 86 has a through axial hole 87 having the same diameter as channel 85, coaxial with the latter and engaged, in a sliding manner, by a rod 88 to allow molten plastic material to fully flow out of first mold 42".

In this case, plunger 86, rod 88 and the surfaces 47, 60, 61, 62 and 63 delimiting mold cavity 44 define pressing means acting on the molten plastic material to transform it into an opening device 3.

The operation of forming apparatus 10" is completely equivalent to the one relative to forming apparatus 10, the only difference being the fact that, for each molding unit 32, the dose 76 is pressed by plunger 86 and rod 88 to fill mold cavity 44, after setting first and second mold 42", 43" in the closed configuration; in other words, the molten plastic material of the dose 76 is not initially pressed by first and second mold 42", 43", while these molds are moving to the closed configuration, but the initial pressing action is performed by plunger 86 and rod 88 after the first and second mold 42", 43" have reached the closed configuration.

The advantages of the forming apparatus 10, 10', 10" according to the present invention will be clear from the foregoing description.

In particular, thanks to the fact that each molding unit 32 performs the molding operation on the packaging material 2 without stopping the latter, the output rate of forming apparatus 10, 10', 10" can be highly increased with respect to the one of known forming apparatus.

In addition, as molding units 32 can be independently moved along molding portion P1 of path P, possible variations of the distances between each receiving portion 8 and the adjacent ones can be corrected by simply controlling the advancement of movable elements 35 along work portion R1 of path R, without any need to act on the packaging material 2. In other words, if the distances between each receiving portion 8 and the adjacent ones are different from the expected values, movable elements 35 can be independently and exactly positioned at the actual locations of the receiving portions 8 without acting on packaging material 2. This leads to a high-quality process to form opening devices 3 on packaging material 2.

Plus, in case of a change of format of the opening devices 3, it is simply necessary to change the first and second molds 42, 43, 42', 43', 42", 43" but not the movable elements 35.

In a different manner, a change of format of the packages 1 simply entailing a variation of the distances between each receiving portion 8 and the adjacent ones does not require any change in the forming apparatus 10, 10', 10" as the movable elements 35 and the first and second molds 42, 43, 42', 43', 42", 43" can be exactly positioned at the actual locations of the receiving portions 8 along path P.

Furthermore, should one molding unit 32 generate in use a disturb on packaging material 2—such as an undesired bend or a pinch—it would be possible to act on the following independent molding unit/s 32 in order to release the tension on the packaging material 2 or to mitigate the effects of the disturb.

Clearly, changes may be made to forming apparatus 10, 10', 10" as described herein without, however, departing from the scope as defined in the accompanying Claims.

In particular, the molding operations described may be also applied on receiving portions 8 of any outer profile, i.e. even not circular, to produce opening devices having tubular pouring elements with non-circular cross-sections, e.g. oval, elliptical or simply defined by closed-loop profiles.

Furthermore, molding units 32 may be of the type adapted to form the opening devices 3 by injecting a molten plastic material.

The invention claimed is:

1. An apparatus for forming opening devices on a sheet packaging material for packaging pourable food products; said apparatus comprising:
    conveying means for advancing said sheet packaging material along a given path;
    at least one molding unit arranged along said path and adapted to compression-mold one opening device on a receiving portion of said sheet packaging material, said at least one molding unit comprising a first mold and a second mold that are movable relative to one another between an open configuration and a closed configuration, the first and second molds being spaced apart from one another in the open configuration and the first and second molds contacting opposite surfaces of the sheet packaging material to delimit a closed mold cavity in the closed configuration, the one opening device being compression-molded on the receiving portion of said sheet packaging material when the first and second molds are in the closed configuration;
    at least one movable element carrying said molding unit and advanced parallel to at least a portion of said path, said portion of said path being linear; said movable element being linearly advanced at the same speed as said sheet packaging material at least during interaction of said molding unit with said sheet packaging material to allow said molding unit to form said opening device while said sheet packaging material is being advanced along said path;
    a sensor adapted to detect the position of said receiving portion of said sheet packaging material and to generate signals that control said at least one movable element based on said detected position of said receiving portion; and
    said first mold and said second mold of said at least one molding unit being carried together along a mold station path such that both the first mold and the second mold move simultaneously together along the mold station path.

2. The apparatus as claimed in claim 1, wherein said closed mold cavity housing one receiving portion of said sheet packaging material is adapted to be filled with molten plastic material to define, when the plastic material sets, the opening device.

3. The apparatus as claimed in claim 2, further comprising actuator means to move at least one of said first and second mold towards the other into said closed configuration.

4. The apparatus as claimed in claim 3, wherein said actuator means move both said first and second mold into said closed configuration.

5. The apparatus as claimed in claim 3, wherein said actuator means comprise cam means arranged parallel to said portion of said path and cooperating with cam follower means carried by at least one of said first and second mold.

6. The apparatus as claimed in claim 2, further comprising:
    feeding means to make a dose of molten plastic material available to said molding unit in said open configuration of said first and second mold; and
    pressing means carried by said molding unit and exerting pressure on said dose to force it to fill said mold cavity and to form the opening device when the first and second molds are in the closed configuration.

7. The apparatus as claimed in claim 6, wherein said feeding means comprise a feed device configured to feed said dose onto said receiving portion of said sheet packaging material in turn advanced between said first and second mold in said open configuration.

8. The apparatus as claimed in claim 6, wherein said feeding means comprise a feed device configured to feed said dose to said first mold in said open configuration.

9. The apparatus as claimed in claim 8, wherein said dose is received in a seat of said first mold.

10. The apparatus as claimed in claim 9, wherein said seat of said first mold is open towards said sheet packaging material and said second mold.

11. The apparatus as claimed in claim 10, wherein said seat defines part of said mold cavity in said closed configuration of said first and second mold.

12. The apparatus as claimed in claim 6, wherein said pressing means comprise respective surfaces of said first and second mold delimiting said mold cavity.

13. The apparatus as claimed in claim 9, wherein said seat is provided on the side of said first mold opposite the side facing said sheet packaging material and said second mold, wherein said seat is connected to said mold cavity, and wherein said pressing means comprise a plunger pressing said dose in said seat to force said molten plastic material to flow into said mold cavity.

14. The apparatus as claimed in claim 1, comprising a plurality of said movable elements carrying respective molding units so that the respective molding units are movable independently from one another.

15. The apparatus as claimed in claim 14, wherein said movable elements are independently moved along a closed loop track; wherein said track houses a plurality of individually-excitable solenoids; and wherein said movable elements house respective permanent magnets and are independently moved along said track by individually controlling the solenoids.

16. The apparatus as claimed in claim 14, wherein said movable elements are independently moved along a closed loop track; wherein said track houses a plurality of permanent magnets; and wherein said movable elements house respective individually-excitable solenoids and are independently moved along said track by individually controlling said solenoids.

17. The apparatus as claimed in claim 1, wherein said at least one molding unit is arranged in a position adjacent to one side of said sheet packaging material and is adapted to protrude towards said sheet packaging material along said portion of said path.

18. An apparatus for forming opening devices on a sheet packaging material for packaging pourable food products, the sheet packaging material comprising a plurality of receiving portions that each receive a respective opening device; said apparatus comprising:
    a conveyor for advancing the sheet packaging material along a path, the path being linear and continuous;

a plurality of molding units arranged to interact with the sheet packaging material while the sheet packaging material is being conveyed along the linear and continuous path, each of the molding units including a first mold and a second mold which are movable relative to one another to be in an open position and a closed position, the conveyor being configured to advance the sheet packaging material between the first and second molds when the first and second molds are in the open position, the first and second molds contacts opposing surfaces of the sheet packaging material to delimit a closed mold cavity in the closed position, each of the molding units being adapted to compression-mold one respective opening device on each of the plurality of receiving portions of the sheet packaging material when the first and second molds are in the closed position;

a plurality of movable elements each configured to advance respective ones of the plurality of molding units linearly along at least a portion of the linear and continuous path of the conveyor while the conveyor linearly advances the sheet packaging material, each of the movable elements being advanced at the same speed as the sheet packaging material at least during interaction of the molding unit with the sheet packaging material to allow the molding unit to form the opening device while the sheet packaging material is being advanced along the continuous path, said movable elements being configured to move each of the respective ones of the plurality of molding units independently relative to other ones of the plurality of molding units;

a sensor adapted to detect the position of a receiving portion of said sheet packaging material and to generate signals that control at least one of the plurality of moveable elements based on said detected position of said receiving portion; and said plurality of molding units being conveyed along a molding station conveying path such that the first mold and the second mold are conveyed simultaneously together along the molding station conveying path, the molding station conveying path forming a single closed loop.

19. The apparatus according to claim 18, wherein the first mold and the second mold move relative to one another in a direction orthogonal to the molding station conveying path to move into the open position, and the first mold and the second mold move relative to one another in the direction orthogonal to the molding station conveying path to move into the closed position.

* * * * *